United States Patent [19]

Yamada et al.

[11] Patent Number: 5,072,819
[45] Date of Patent: Dec. 17, 1991

[54] ROLLER CONVEYOR DEVICE AND SCRAPER FOR ROLLER

[75] Inventors: Sohei Yamada; Hatsuo Orihashi, both of Kobe, Japan

[73] Assignee: Kabushiki Kaisha Kosmek, Kobe, Japan

[21] Appl. No.: 703,762

[22] Filed: May 21, 1991

[30] Foreign Application Priority Data

Jun. 5, 1990 [JP] Japan ................ 2-59950[U]

[51] Int. Cl.$^5$ .................................. B65G 13/00
[52] U.S. Cl. .................. 193/35 R; 198/497; 198/780
[58] Field of Search ............. 193/35 R; 198/497, 780; 15/256.5, 256.51

[56] References Cited

U.S. PATENT DOCUMENTS 2,267,429 12/1941 Stebler ...................... 198/780 X

FOREIGN PATENT DOCUMENTS 63-90530 6/1988 Japan .

Primary Examiner—Joseph E. Valenza
Assistant Examiner—Tuan N. Nguyen
Attorney, Agent, or Firm—Bacon & Thomas

[57] ABSTRACT

In a roller conveyor device, a plurality of rollers (7) are rotatably supported by left and right support walls (16)(16) which extend in the fore and back direction and scrapers (21) are provided on the fore and the back sides of each roller (7) respectively between both the support walls (16)(16). The scraper (21) comprises an upper wall (24a), a left and a right side walls (22b)(24b) and scraper portions (25) projected integrally in the fore and back direction from the upper wall (24a) and adapted to be kept in contact with an upper portion of an outer peripheral surface of each roller (7). Spherical shelly convexed portions (27)(27) are provided in each said side wall (24b), and through-holes (29)(29) for engaging with the respective spherical shelly convexed portions (27)(27) are opened in the inside surfaces of the respective support walls (16)(16).

9 Claims, 3 Drawing Sheets

ROLLER CONVEYOR DEVICE AND SCRAPER FOR ROLLER

BACKGROUND OF THE INVENTION

1. Field of the Invention

The present invention relates to a roller conveyor device adapted to convey a conveyed object such as a metal mould of a press machine and the like through a plurality of rollers on which the conveyed object is placed and also to a scraper for a roller for use in the roller conveyor device.

2. Prior Art

As such a roller conveyor device, conventionally has been known the one shown both in a vertical sectional view of FIG. 6 and in a plan view of FIG. 7 and known by inventors of the present invention.

That is, a plurality of rollers 107 are arranged fore and back in parallel between a left and a right support walls 116, 116 extending in the fore and back direction. Each roller 107 is rotatably supported between both the support walls 116, 116 in such a state that an upper portion of its outer peripheral surface is projected above the upper surfaces of the support walls 116, 116. The symbol S designates a conveyance surface for the metal mould and so on. Between both the support walls 116, 116 there are provided intermediate scrapers 121 on the fore side and the back side of each roller 107 respectively and end scrapers 122.

The intermediate scraper 121 has a base block 141 having a reversed U-shaped cross section. The base block 141 is fixedly secured to respective through-holes 143, 143 of the support walls 116, 116 through two spring pins 142, 142. Fore and back scraper members 144, 144 are fixedly secured onto the upper surface of the base block 141 through a press plate 145 by means of four bolts 146. Also the end scraper 122 is constructed similarly to the intermediate scraper 121.

There are, however, the following problems associated with the above-mentioned conventional construction.

(a) It takes much trouble for installation of the scrapers.

The work for installing the intermediate scraper 121 are to be carried out according to the following steps (1) through (5).

(1) Firstly, the base block 141 is inserted between the support walls 116, 116 from above.

(2) Then, an insertion level of the base block 141 is decided in accordance with the height position of the through-holes 143, 143.

(3) Under this condition, the spring pins 142, 142 are inserted through both the respective through-holes 143, 143 and the base block 141 so that the base block 141 can be fixedly secured to the support walls 116, 116.

(4) The scraper members 144, 144 are placed onto the upper surface of the base block 141.

(5) The scraper members 144, 144 are fixedly secured onto the base block 141 by means of a plurality of bolts 146 under the pressed condition by the press plate 145.

As mentioned above, since at least five steps are required for installing the scraper 121 between the support walls 116, 116, it takes much trouble for such installation.

(b) It takes much trouble for adjusting a scraper frictional resistance (referred to as a scraper resistance hereinafter).

Since the aforementioned scraper 121 comprises five kinds of component members such as the base block 141, the spring pin 142, the scraper member 144, the press plate 145 and the bolt 146, dimensional errors can't help being accumulated after completion of their assembly. As a result, in case that they are merely assembled, there might be provided a scattering in the scraper resistance applied from the scraper member 144 onto the roller 107 and a fine adjustment might be required for locating the scraper member 144 in place. Therefore, it takes much trouble for the adjustment work of the scraper resistance.

Incidentally, the aforementioned problems (a) and (b) are similarly associated with the end scraper 122, too.

SUMMARY OF THE INVENTION

It is an object of the present invention to facilitate an installation work of a scraper and an adjustment work of a scraper resistance.

For accomplishing the above-mentioned object, a roller conveyor device with scrapers according to the present invention is constructed as follows.

A plurality of rollers are rotatably supported between a left and a right support walls extending in the fore and back direction, in such a state that upper portions of their outer peripheral surfaces are projected above the upper surfaces of the support walls. Between both the support walls there are provided scrapers on the fore side and the back side of each roller respectively. Each scraper comprises an upper wall, a left and a right side walls and a scraper portion projected in the fore and the back directions integrally from the upper wall so as to be brought into contact with the upper portion of the outer peripheral surface of each roller. The respective side walls are provided with engaged portions, and the respective support walls are provided at their insides with engaging portions adapted to receive the engaged portions.

The intermediate scraper employed in the roller conveyor device is constructed as follows.

The base portion of the scraper comprises the upper wall and the left and the right side walls. The fore and the back scraper portions are projected in the obliquely upper direction integrally from the opposite fore and back ends respectively. The respective side walls are provided with the engaged portions.

Further, an end scraper employed in the roller conveyor device is constructed as follows.

A base portion of the scraper comprises an upper wall, left and right side walls and a cover wall projected downward from one of the opposite fore and back ends of the upper wall. A scraper portion is projected in the obliquely upper direction integrally from the other of the opposite fore and back ends of the upper wall. The respective side walls are provided with the engaged portions.

According to the present invention, the following advantages can be provided.

(a) It becomes easy to installed the scrapers.

When the scraper is installed between both the support walls, firstly the scraper is put therebetween from above and the scraper upper wall is pushed down while the engaged portions of the scraper side walls are adjusted in position in the fore and back direction relative to the engaging portions of the support walls. Then, the engaged portions are engaged with the engaging portions and at the same time the leading ends of the scraper portions are brought into resilient contact with the outer peripheral surface of each roller, so that the installation work is completed.

Since the scraper installation work can be performed by one continous procedure in that way, the number of steps can be remarkably reduced in comparison with five steps of the conventional embodiment so that the work becomes easy.

(b) It becomes possible to omit the adjustment work of the scraper resistance.

Since the scraper is formed integrally from the scraper portion and the base portion comprising the upper wall and the left and the right side walls, the dimensional accuracy is improved as well as the adjustment work of the scraper resistance can be omitted.

BRIEF DESCRIPTION OF THE DRAWINGS

FIG. 1 is an exploded perspective view of a roller conveyor device;

FIG. 2 is an elevational view of a press machine equipped with the roller conveyor device;

FIG. 3 is a vertical sectional view of the roller conveyor device;

FIG. 4 is a plan view of the roller conveyor device;

FIG. 5 is a sectional view taken along the V—V directed line in FIG. 3;

FIG. 6 is a view corresponding to FIG. 3; and

FIG. 7 is a view corresponding to FIG. 4.

DESCRIPTION OF THE PREFERRED EMBODIMENT

One embodiment of the present invention will be explained with reference to FIGS. 1 through 5. In the following description, the left and right direction in respective FIGS. 1 through 4 will be represented by the fore and back direction and the vertical direction in FIG. 4 will be represented by the left and right direction.

Figure 1:
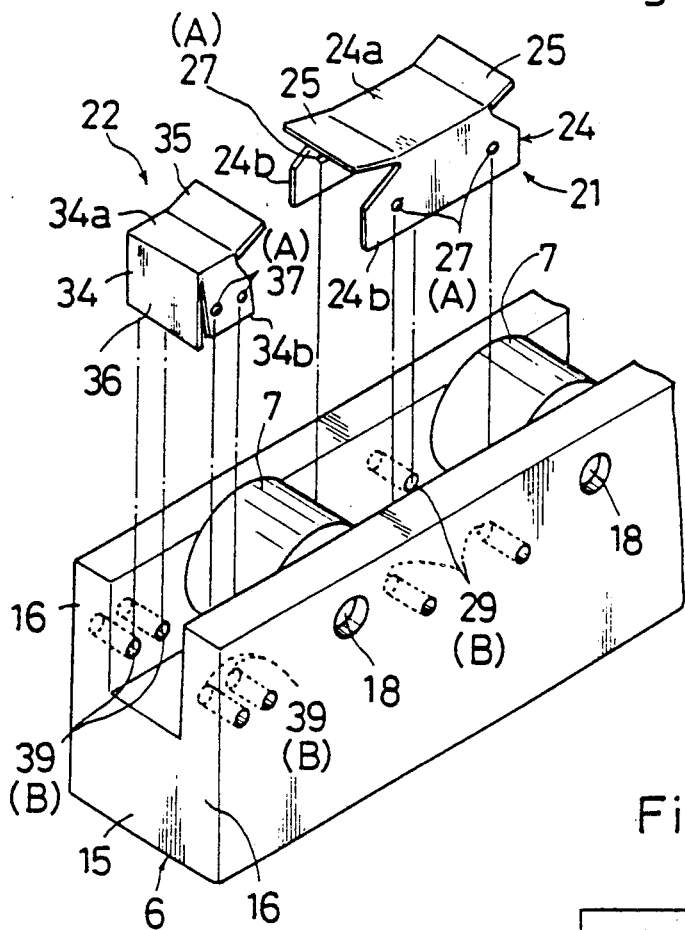
FIGS. 1 through 5 show one embodiment of the present invention.
Figure 2:
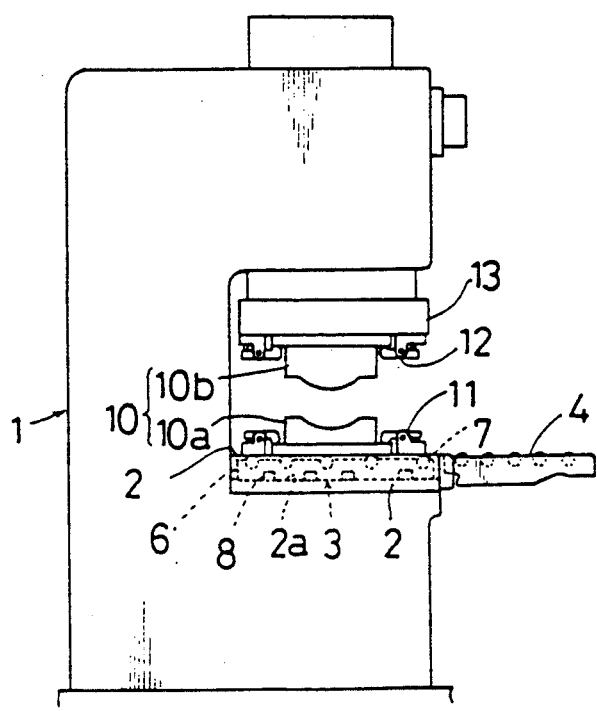
Figure 4:
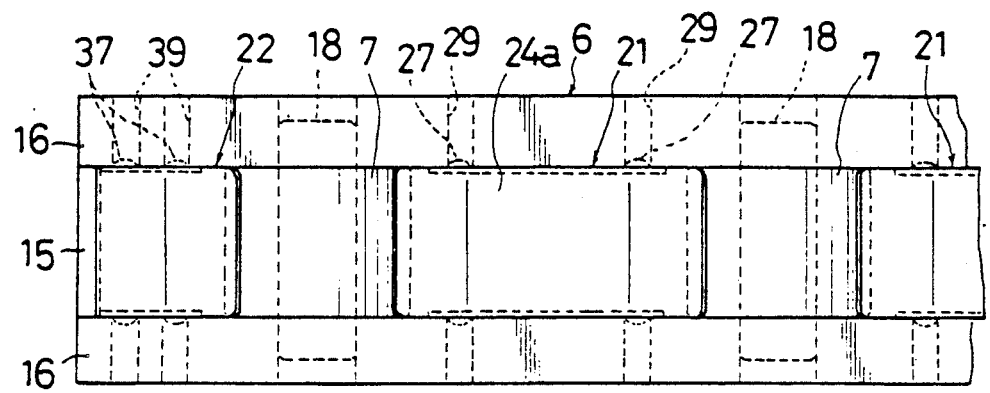

In FIG. 2, a press machine 1 is equipped with both an internally mounted roller conveyor device 3 of the elevatory type, inserted into a U-shaped groove 2a of a bolster 2 and a detachable roller conveyor device 4 installed to the front side of the bolster 2 in the cantilevered posture. The internally mounted roller conveyor device 3 has a plurality of rollers 7 and a plurality of single-acting spring-returned type hydraulic cylinders 8 provided in a conveyance rail 6 extending in the fore and back direction.

At the time of bringing in and out a metal mould 10, a conveyance plane S (refer to FIG. 3) of the rollers 7 is projected above an upper surface 2b of the bolster 2 by extending the hydraulic cylinder 8 by means of a hydraulic pressure so as to raise the conveyance rail 6. Under this condition, the metal mould 10 is brought onto the conveyance plane S of the internally mounted roller conveyor device 3 from the detachable roller conveyor device 4. Then, by discharging a pressurized oil from the hydraulic cylinder 8 as well as contracting the hydraulic cylinder 8 by means of a spring force so as to lower the conveyance rail 6, the conveyance plane S of the rollers 7 is lowered below the upper surface 2b of the bolster 2. After that, a lower metal mould 10a is fixedly secured onto the upper surface 2b of the bolster 2 by means of a hydraulic clamp 11, and an upper metal mould 10b is fixedly secured to a lower surface of a slide 13 by means of a hydraulic clamp 12.

Now, a construction of the aforementioned internally mounted roller conveyor device 3 will be explained with reference to FIG. 1 and FIGS. 3 through 5 hereinafter.

The conveyance rail 6 is so formed as to have a U-shaped cross section and extend in the fore and back direction and is provided with a bottom wall 15 and left and right support walls 16, 16. A plurality of rollers 7 are arranged side by side in parallel in the fore and back direction between those support walls 16, 16. Each roller 7 is rotatably supported between the support walls 16, 16 through a pivot shaft 18 in such a state that the upper portion of its outer peripheral surface is located above the upper surfaces of the support walls 16, 16.

Intermediate scrapers 21 are installed between the adjacent rollers 7, 7 and between both the support walls 16, 16, and end scrapers 22 are installed outside the rollers 7 on the opposite fore and back end sides, respectively.

The intermediate scraper 21 comprises a base portion 24 having a reversed U-shaped cross section and two scraper portions 25, 25 and is integrally formed by bending one sheet of spring plate of stainless steel. The base portion 24 comprises an upper wall 24a and left and right side walls 24b, 24b. The scraper portions 25, 25 are projected in the obliquely upper direction from the opposite fore and back ends of the upper wall 24a. Each side wall 24b is formed in a trapezoidal configuration in side view and is provided with two spherical shelly convexed portions 27, 27 swelled outwardly as an engaged portion A.

Corresponding to these engaged portions A, two through-holes 29, 29 are formed in the respective support walls 16, 16 in parallel with the roller axis, so that engaging portions B are provided by inside aperture portions of those through-holes 29, 29.

The aforementioned intermediate scraper 21 is installed between the support walls 16, 16 according to the following procedure.

Firstly, the opposed side walls 24b, 24b of the scraper 21 are inserted between the support walls 16, 16 from above, and then the upper wall 24a is pushed down with the spherical shelly convexed portions 27 of the scraper side walls 24b being adjusted in position in the fore and back direction relative to the through-holes 29 of the support walls 16. Thereupon, the spherical shelly convexed portions 27 are fitted into the through-holes 29 so that the base portion 24 can be fixedly secured to the support walls 16, 16, and simultaneously the leading ends of the scraper portions 25, 25 are brought into resilient contact with the outer peripheral surfaces of the roller 7, 7, so that the installation work is completed.

On one hand, the end scraper 22 is integrally formed from one sheet of spring plate similarly to the aforementioned intermediate scraper 21 so as to be composed of the base portion 34 having the reversed U-shaped cross section and the scraper portion 35. The base portion 34 comprises the upper wall 34a, the left and the right side walls 34b, 34b and the cover wall 36 projected downwardly from one of the opposite fore and back ends of the upper wall 34a. The scraper portion 35 is projected in the obliquely upper direction from the other of the opposite fore and back ends of the upper wall 34a. In the respective side walls 34b there are provided two spherical shelly convexed portions 37, 37 swelled outwardly as the engaged portions A. Corresponding to these engaged portions A, two through-holes 39, 39 are formed in the respective support walls 16, 16 so that the inside aperture portions of the these through-holes 39, 39 provide the engaging portions B.

Also the end scraper 22 is installed in accordance with the same procedure as that of the intermediate scraper 21.

That is, when the spherical shelly convexed portions 37 are fitted into the through-holes 39 by inserting the end scraper 22 between both the support walls 16, 16 from above, the leading end of the scraper portion 35 is brought into resilient contact with the upper portion of the outer peripheral surface of the end roller 7 from above.

According to the above-mentioned embodiment, the following advantages can be provided.

Since the installation work of the intermediate scraper 21 is carried out by one continuous manipulation, the number of the procedure steps can be significantly reduced so as to facilitate such work.

Since the scraper 21 is formed integrally from the base portion 24 comprising the upper wall 24a and the left and right side walls 24b, 24b and the scraper portion 25, the dimensional accuracy can be improved as well as the adjustment work of the scraper resistance can be omitted.

Since the engaged portions A of the scraper 21 are projected outwardly from the side walls 24a of the base portion 24, it becomes easy to confirm their positional coincidence with the engaging portions B by visually checking so as to improve the installation workability. Further, since the engaged portions A are constructed by a plurality of spherical shelly convexed portions 27, the process of forming these engaged portions A becomes easy so as to enable to reduce the manufacturing cost.

Since the engaging portions B of the support walls 16 are constructed by the through-holes 29, the process of forming these engaging portions B becomes easy so as to enable to reduce the manufacturing cost.

Since the base portion 24 and the scraper portions 25 of the scraper 21 are constructed by a bending process of one sheet of spring plate, a reduction of the manufacturing cost and an enhancement of the dimensional accuracy can be made compatible.

Figure 3:
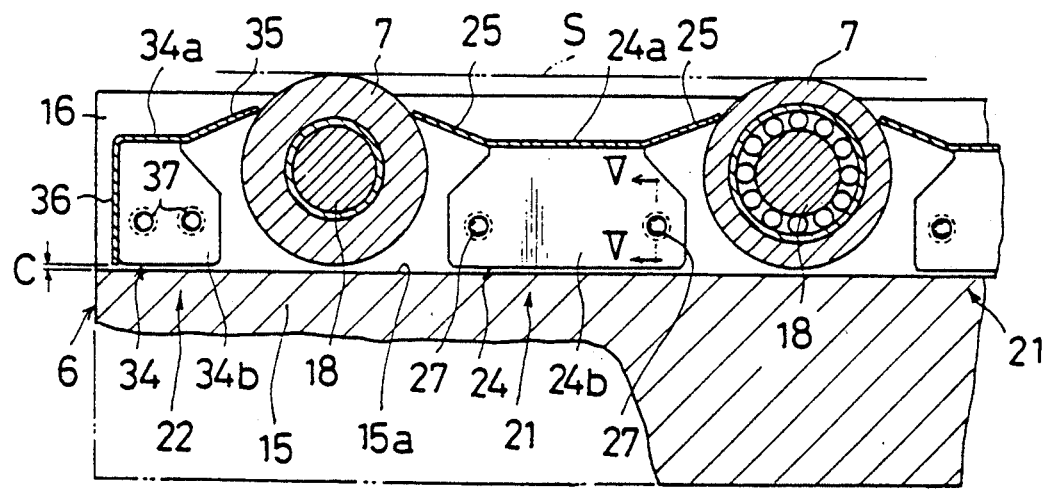
Figure 5:
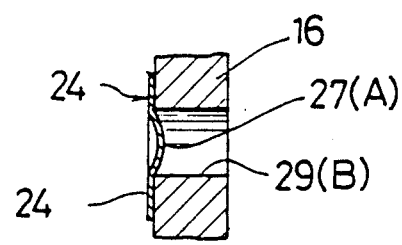
Figure 7:
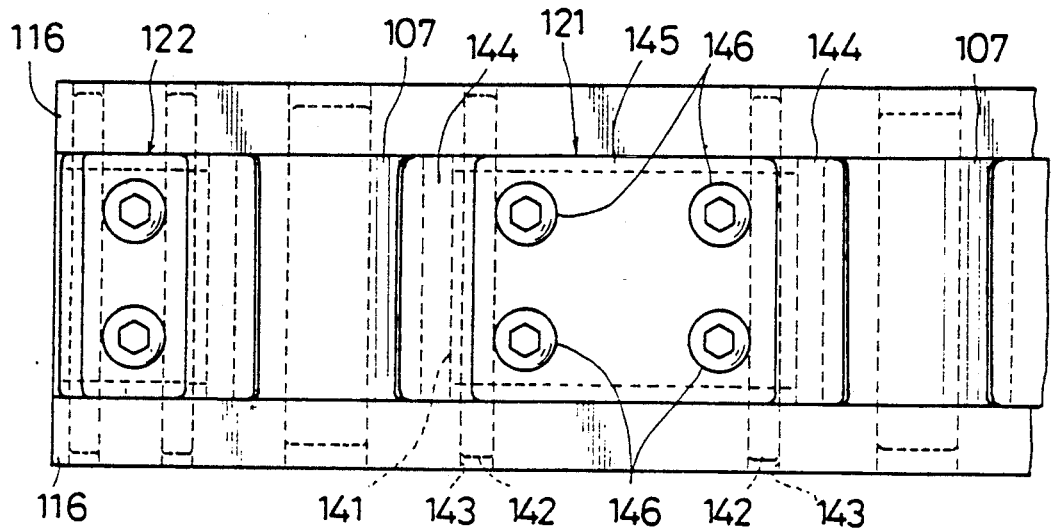
FIGS. 6 and 7 show a conventional embodiment.
Figure 6:
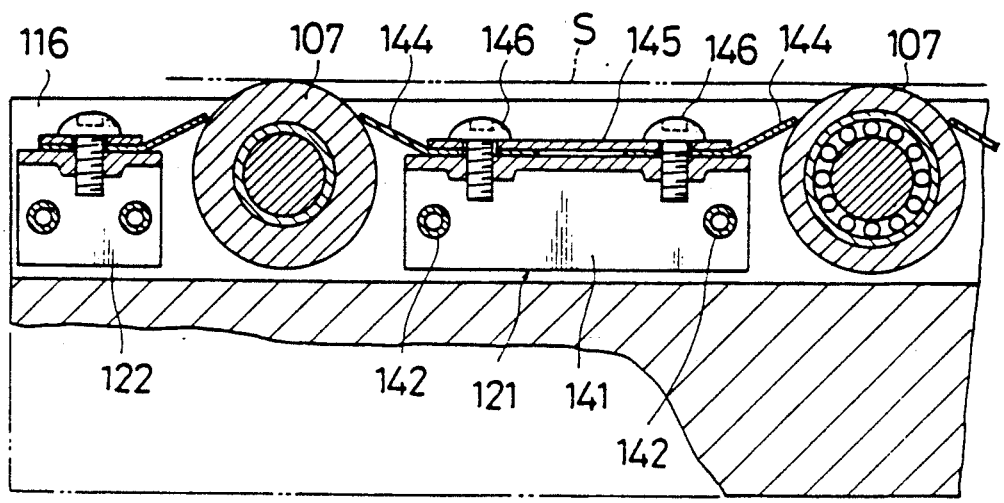

As illustrated in FIG. 3, in case that a gap C between the upper surface 15a of the bottom wall 15 of the conveyance rail 6 and the lower surface of the installed scraper 21 is set at a small dimension, further the following advantages can be provided. That is, even in case that a pushing down force which might be caused by a collision with other things and so on is applied to the installed scraper 21, it is possible to prevent a cancellation of the fitted condition between the engaged portions A and the engaging portions B because the lower ends of the side walls 24b are adapted to be received by the upper surface 15a of the bottom wall 15. Further, at the time of installation of the scraper 21, the engaged portions A can be readily fitted to the engaging portions B because the upper surface 15a of the bottom wall 15 is adapted to prevent the side walls 24b from being lowered farther than a necessary level.

Also by the end scraper 22, can be provided the same advantages as those of the intermediate scraper 21. Incidentally, according to the end scraper 22, since a reaction force acting from the end roller 7 to the scraper portion 35 is adapted to be received by the upper surface 15a of the bottom wall 15 through the lower end of the cover wall 36, it is possible to hold a resilient contact force of the scraper portion 35 within a suitable range.

Incidentally, the engaged portion A and the engaging portion B may be modified as explained in the following items (a) through (c).

(a) In the case that the engaged portion A is formed integrally with the side wall 24b (34b), it may be constructed by an elliptical swelled portion or a stepped portion instead of the spherical shelly convexed portion. In the case that it is formed separately from the side wall 24b (34b), engaged members may be fixed by means of a spot welding and the like.

(b) The engaging portion B may be constructed by a concaved hole instead of the aperture portion of the through-hole 29 (39) or may be constructed by one groove extending in the fore and back direction instead of its plural formations on one side.

(c) Instead of the convexed engaged portion A and the concaved engaging portion B, the engaged portion A may be formed in a concaved configuration as well as the engaging portion B may be formed in a convexed configuration.

Further, the internally mounted roller conveyor device 3 may have the conveyance rail 6 of the type being raised by a spring force and being lowered for return by a clamping force of the hydraulic clamp 11 instead of the type being raised by the hydraulic force and returned by the spring force.

Furthermore, the present invention may be applied also to the aforementioned detachable roller conveyor device 4.

As many different embodiments of the invention will be obvious to those skilled in the art, some of which have been disclosed or referred to herein, it is to be understood that the specific embodiments of the present invention as presented herein are intended to be by way of illustration only and are not limiting on the invention, and it is to be understood that such embodiments, changes, or modifications may be made without departing from the spirit and scope of the invention as set forth in the claims appended hereto.

What is claimed is:

1. A roller conveyor device comprising:
   a conveyance rail (6) having opposite fore and back sides and opposed left and right sides;
   left and right support walls (16)(16) provided in said conveyance rail (6), each of which having an upper surface and an inside surface and being elongated in the fore and back direction;
   a plurality of rollers (7) arranged in the fore and back direction, each of which having an outer peripheral surface and being rotatably supported by both said support walls (16)(16) under such a condition that the upper portion of said outer peripheral surface is projected above the upper surfaces of said support walls (16)(16);
   scrapers (21) provided on the fore and the back sides of each roller (7) respectively between both said support walls (16)(16) and comprising an upper wall (24a), a left and a right side walls (24b)(24b) and a scraper portion (25) projected integrally from said upper wall (24a) in the fore and back direction and adapted to be kept in contact with the upper portion of the outer peripheral surface of each roller (7);
   an engaged portion (A) provided in each said side wall (24b); and an engaging portion (B) adapted to receive said engaged portion (A) and provided in the inside surface of each said support wall (16).

2. A roller conveyor device as defined in claim 1, wherein
said engaged portion (A) is projected outwardly in the left and right direction from said side wall (24b), and said engaging portion (B) is concaved outwardly in the left and right direction from the inside surface of said support wall (16).

3. A roller conveyor device as defined in claim 2, wherein
said engaged portion (A) is composed of a plurality of spherical shelly convexed portions (27)(27), and said engaging portion (B) is composed of a plurality of through-holes (29)(29).

4. A scraper for a roller, which scraper comprising:
a base portion (24) having opposite fore and back sides and opposed left and right sides and comprising an upper wall (24a) and left and right side walls (24b)(24b);
fore and back scraper portions (25)(25) projected integrally in the obliquely upper direction from the opposite fore and back ends of said upper wall (24a) respectively; and
an engaged portion (A) provided in each said side wall (24b).

5. A scraper for a roller as defined in claim 4, wherein
said engaged portion (A) is composed of a plurality of spherical shelly convexed portions (27)(27) projected outwardly in the left and right direction from each said side wall (24b).

6. A scraper for a roller as defined in claim 4, wherein
said upper wall (24a), said left and right side walls (24b) (24b) and both said scraper portions (25)(25) are constructed by bending one sheet of spring plate.

7. A scraper for a roller, which scraper comprising:
a base portion (34) having opposite fore and back sides and opposed left and right sides and comprising an upper wall (34a), a left and a right side walls (34b)(34b) and a cover wall (36) projected downwardly from one of the opposite fore and back ends of said upper wall (34a);
a scraper portion (35) projected integrally in the obliquely upper direction from the other of the opposite fore and back ends of said upper wall (34a); and
an engaged portion (A) provided in each said side wall (34b).

8. A scraper for a roller as defined in claim 7, wherein
said engaged portion (A) is composed of a plurality of spherical shelly convexed portions (37)(37) projected outwardly in the left and right direction from each said side wall (34a).

9. A scraper for a roller as defined in claim 7, wherein
said upper wall (34a), said left and right side walls (34b)(34b), said cover wall (36) and said scraper portion (35) are constructed by bending one sheet of spring plate.

* * * * *